UNITED STATES PATENT OFFICE 2,524,840

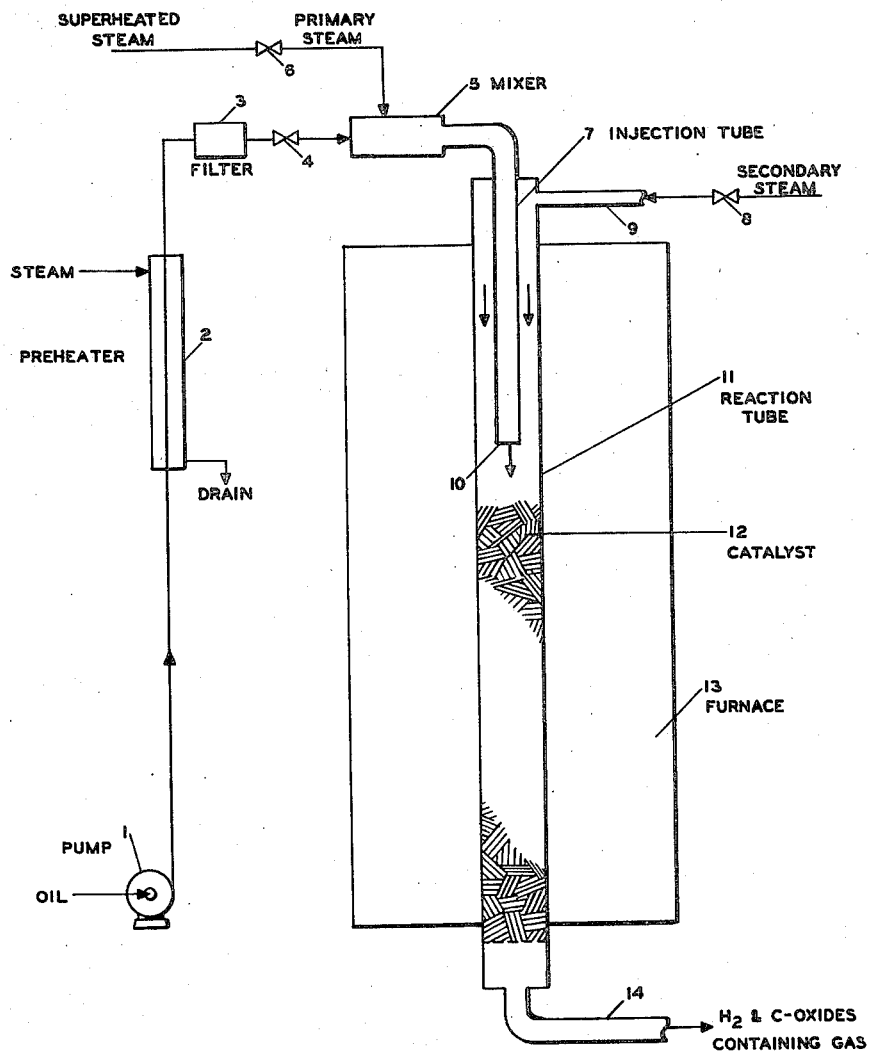

HYDROGEN PRODUCTION

James H. Shapleigh, Wilmington, Del., assignor to Hercules Powder Company, Wilmington, Del., a corporation of Delaware Application February 6, 1945, Serial No. 576,481

8 Claims. (Cl. 23—212)

This invention relates to the preparation of hydrogen from petroleum hydrocarbons, and more particularly, to a process comprising the catalytic conversion of normally liquid petroleum hydrocarbons with steam at an elevated temperature into hydrogen and oxides of carbon.

The commercial preparation of hydrogen assumes major proportions in industrial chemical operations, such as the synthesis of ammonia from nitrogen and hydrogen, the hydrogenation of vegetable oils, the cracking of heavy petroleum oils with simultaneous hydrogenation to form lighter fractions including gasoline, the hydrogenation of natural resins to give products with improved characteristics, the synthesis of alcohols, particularly methanol, and the like.

There are two principal sources of hydrogen that are of commercial significance. They are water, which is about 11% by weight hydrogen, and hydrocarbons, which contain 25% (as in methane) or less hydrogen, by weight.

Hydrogen has been prepared commercially from water as the sole source of the hydrogen by (1) electrolysis, (2) reaction with heated metals, particularly iron, and (3) reaction with heated carbon.

Hydrogen is an incidental product in a number of processes of commercial significance in which hydrocarbons constitute the sole source of the hydrogen. They are: (1) the thermal decomposition of natural gas in the preparation of carbon black, (2) the thermal cracking of heavy fraction petroleum oils to lighter fractions such as gasoline, and (3) the dehydrogenation of petroleum hydrocarbons in the preparation of (a) olefins and (b) aromatics.

Recognition of the possibility of combining the thermal decomposition of natural gas into carbon and hydrogen, with the reaction of carbon with steam, first into a unitary process utilizing the two reactions as two separate steps of a single process, and eventually into a continuous process where both reactions are performed simultaneously, has led to the well-known process represented by the equation:

$$CH_4 + 2H_2O = CO_2 + 4H_2 \qquad (1)$$

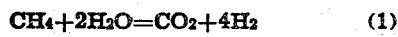

wherein hydrogen is obtained from both water and a hydrocarbon simultaneously. This net result has been obtained also by carrying out the reactions represented by the equations:

$$CH_4 + H_2O = CO + 3H_2 \qquad (2)$$
$$CO + H_2O = CO_2 + H_2 \qquad (3)$$

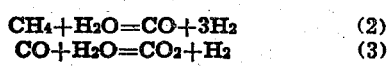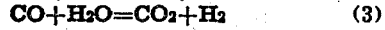

There are many factors involved in any commercial process which utilizes these reactions, and the art related thereto is extensive. Satisfactory processes are known for reacting a mixture of a gaseous hydrocarbon, such as natural gas, with steam at an elevated temperature and in the presence of a catalyst comprising an element of the iron group, preferably nickel, with or without one or more so-called activating substances, such as alumina and other difficultly reducible oxides. However, operation of these processes has not been without difficulties, particularly from carbon deposition on the catalyst which lowers the efficiency of the catalyst as well as plugging the apparatus. This is particularly true of the higher and thermally less stable hydrocarbons. Consequently, hydrogen production by catalytic reaction of hydrocarbons with steam has been practically limited on a commercial scale to the use of methane or natural gas. For example, attempts heretofore to utilize commercial propane for hydrogen production have resulted in unsatisfactory results, principally on account of the inability to prevent carbon deposition in the apparatus and on the catalyst.

The difficulty in using higher hydrocarbons in the production of hydrogen in tubular furnaces is due to the fact that the hydrocarbon passes through a preheating zone prior to reaching the temperatures necessary for efficient reaction with the steam to produce hydrogen and oxides of carbon. The space velocities that must be utilized and the temperatures required bring about a time factor in this preheating stage which results in favorable conditions for carbon deposition by thermal decomposition. The heavier the hydrocarbon, the greater the tendency toward carbon deposition, particularly in the case of unsaturates. Consequently, heretofore, no satisfactory process has been discovered whereby higher petroleum hydrocarbons, particularly those which comprise normally liquid petroleum oils, can be reacted directly with steam to produce hydrogen and oxides of carbon without the simultaneous production of large quantities of carbon and/or other hydrocarbons.

Now in accordance with the present invention, a process has been discovered for preparing hydrogen by the reaction of higher petroleum hydrocarbons with steam in contact with a catalyst therefor. Furthermore, this process may be operated in a substantially continuous manner and so as to bring about a high percentage of conversion of the hydrocarbon constituents, with the steam, into hydrogen and oxides of carbon as substantially the sole products.

Described in a general manner, it now has been discovered that higher petroleum hydrocarbons at comparatively low temperatures may be injected into a stream of superheated steam with a temperature of about 800° F. to about 1200° F. to partially heat the hydrocarbons by sensible heat of the superheated steam and the admixture then subjected immediately to indirect heating, while in contact with a suitable catalyst, to the high temperatures desirable for hydrogen production and without appreciable carbon deposition. With normally liquid petroleum hydrocarbons (oils), this may be accomplished by atomizing the oil with steam (or other suitable gas) without heating to a thermal decomposition temperature, injecting the atomized mixture into a stream of superheated steam (or other suitable gaseous medium containing the required amount of sensible heat) to substantially completely vaporize the oil and form a gaseous mixture of hydrocarbons and steam, and immediately thereafter contacting the mixture with a nickel-containing catalyst maintained by indirect heating at a suitable elevated temperature. Thereby, the hydrocarbons may be transformed by reaction with the steam, into a mixture of hydrogen and oxides of carbon. The process may be operated so that there is substantially no recoverable normally liquid hydrocarbon, or substantial amounts of any other hydrocarbons, in the resulting product obtained from the process.

Having now indicated in general the nature and purpose of the present invention, there follows a more detailed description of the invention with reference to the accompanying drawing which represents, diagrammatically, a flow sheet indicating the production of hydrogen by the catalytic reaction of a petroleum oil with steam.

Referring now to the drawing, the present invention will be described as a process of producing hydrogen from a mixture of petroleum oil and steam.

The petroleum oil is delivered by means of pump 1 from any suitable oil reservoir to preheater 2 where it is heated with steam by indirect heat exchange. The preheated oil is then filtered by means of filter 3, valved by means of valve 4, and delivered to the mixer 5, where it is atomized with a primary stream of superheated steam (called primary steam) and delivered to the mixer 5 through valve 6. The atomized mixture of preheated oil and primary steam is then injected axially by means of injection tube 7 into a concurrently moving concentrically disposed body of a secondary stream of superheated steam (called secondary steam). The injection tube 7 extends for a considerable distance into the entrance end of the reaction tube 11 which is heated by the furnace 13. The atomized mixture of oil and primary steam is confined within the injection tube until it exits at the exit end 10 thereof. Thus, it is heated to some extent by indirect heat transfer from the furnace, by means of heat transfer by the secondary steam which is delivered to the reaction tube 11 by means of valve 8 and conduit 9, and flows concurrently with the oil-primary steam mixture, the atomized oil-primary steam mixture within, and the secondary steam outside, the injection tube. The oil-primary steam mixture exits from the injection tube at 10 and into the annular stream of secondary steam. The reaction tube 11 is preferably a chromium-alloy steel composition.

The atomized oil-primary steam mixture is thereby intimately admixed with the heated secondary steam and quickly heated further by direct heat exchange of sensible heat of the secondary steam. The atomized oil is vaporized and the gaseous mixture of hydrocarbons and steam is passed immediately into contact with the heated catalyst mass 12. The hydrocarbons and steam are catalytically converted into a gaseous mixture, composed for the most part of hydrogen and oxides of carbon, and containing only a minor amount of hydrocarbons, which is principally methane.

In accordance with this invention and to illustrate in more particular the method of producing hydrogen and oxides of carbon by the catalytic reaction of a petroleum oil with steam, the following examples are given:

*Example I*

With reference to the diagram in the drawing, a petroleum hydrocarbon oil fraction with a boiling range of about 390° F. to 480° F. (for the 10%–90% cut), an A. P. I. gravity of about 38, and a sulfur content of about 0.2%, was preheated in preheater 2 to about 180° F. and then admixed with and atomized by primary superheated steam (about 230° F.) in the mixer 5. The steam and oil were mixed in a weight ratio of about 1.3 to 1 of steam to oil. The resulting atomized mixture of oil-primary steam was then delivered to the cracking tube by means of the injection tube 7. The atomized mixture was heated during its passage through the injection tube, the temperature in the stream of oil-primary steam at the exit end 10 of the injection tube being maintained at about 415° F.

A secondary stream of steam was delivered to the entrance end of the reaction tube 11 and caused to flow concurrently with and concentric to the flow of the oil-primary steam mixture, but outside the injection tube. In this manner the mixture of oil and primary steam was injected into and admixed with the secondary steam immediately past the exit end of the injection tube. The ratio of secondary steam to primary steam was approximately 2.7 to 1, making a ratio of total steam to oil of about 4.8 to 1, by weight.

The reaction tube in the region of the exit end of the injection tube was maintained at a temperature of about 1350° F. The oil within the injection tube was heated to partial vaporization by the time it reached the exit end of the injection tube but without appreciable thermal cracking and carbon formation. Also, in this manner, the secondary steam was heated to a temperature of the order of about 1200° F. before it was mixed with the oil-primary steam mixture.

A free zone was provided past the exit end of the injection tube wherein the oil and primary steam mixture was thoroughly admixed with the secondary steam prior to contacting the catalyst mass.

The resulting mixture was contacted with a nickel-magnesia catalyst maintained with an increasing temperature gradient throughout most of the catalyst body in the direction of gaseous flow. The temperature of the first portion of catalyst contacted was of the order of about 1200° F., with the successive portions increasing up to from about 1700° F. to about 2000° F. Of course, the catalyst within the reaction tube near the exit thereof from the furnace was at a temperature lower than the peak temperature. The gaseous mixture contacted the catalyst mass at a space velocity of about 500 cubic feet of steam (calculated under normal atmospheric conditions of temperature and pressure) per cubic foot of catalyst per hour.

The catalyst was a mass of compressed lumps comprising nickel, magnesia, and zirconium silicate. It was prepared by adding about 4 parts by weight of magnesia to about 15 parts by weight of molten nickel nitrate hexahydrate to form a uniform pastelike mixture, drying, calcining to a nickel oxide-magnesia mass, admixing with about 2 to 3 parts by weight of finely divided zirconium silicate, compressing into compact lumps, and subjecting to reducing conditions to convert the nickel oxide to nickel.

The temperature of the resulting cracked gaseous product in the exit tube immediately outside the heating zone of the furnace was about 1430° F. The product, after separating the unchanged steam, had the following approximate composition, expressed as volume percentage: $CO_2$, 11.3%; CO, 19.2%; $CH_4$, 0.5%; unsaturates, 0.0; $N_2$, 0.4%; $H_2S$, 5.9 grains per 100 cubic feet; carbonized oil, none; $H_2$, 68.6%.

Thus, over 98% of the carbon of the original hydrocarbon mixture was converted with steam into oxides of carbon with the corresponding liberation of hydrogen from both the hydrocarbons, and the steam reacting therewith to give the oxides of carbon. Furthermore, about 37% of the total carbon was converted into carbon dioxide with substantially all of the remainder being converted to carbon monoxide.

Examination of the injection tube showed that it was perfectly clean and that no carbon had been deposited in it as a result of premature thermal decomposition of the oil within the tube. Furthermore, there was only a very small amount of carbon deposited on the catalyst and that only upon a thin layer of the catalyst first contacted by the oil-steam mixture.

*Example II*

This example was substantially a duplication of Example I with the exception that in this example a heavier petroleum hydrocarbon oil was used. In this example the oil had an A. P. I. gravity of about 32, a boiling range (10%–90%) of about 480° F. to about 630° F. and a sulfur content of about 0.4%. The temperature in the oil-primary steam mixture in the exit end of the injection tube was about 445° F. and the temperature of the cracked products in the exit tube was about 1415° F. The cracking was over 96% into oxides of carbon, while 40.8% of the carbon was converted to carbon dioxide, and substantially all of the remainder was converted to carbon monoxide. The cracked gases contained about 20 grains of hydrogen sulfide per 100 cubic feet of gas (measured at normal atmospheric conditions).

As in Example I, there was no carbonized oil in the exit product.

*Example III*

This example was similar to Example II, using the same type oil as in Example II (a Diesel grade oil), but beginning with a higher ratio of oil to steam. In this example the same amount of steam was used as in Examples I and II, but the rate of oil flow was increased to give a ratio of total steam to oil of about 2.9 to 1. The temperature at the outlet of the injection tube was about 420° F. and in the exit gases from the cracking tube, it was about 1355° F.

The hydrocarbons in the oil were completely reacted but the cracked gases contained a larger percentage of methane (3.7%) than in Examples I and II, with a corresponding drop in the conversion of the carbon in the original hydrocarbons to oxides of carbon to about 86%. There was 0.7 of 1% of unsaturates in the cracked gas. The exit gases contained 44% steam by volume.

The rate of oil flow was then decreased to give the same conditions as in Example II, except that the exit cracked gas temperature was maintained at about 1365° F. The result was an increase in percentage cracking to about 95% with substantially no unsaturates (about 0.1%) in the cracked gases, and about 46% of the carbon oxides in the form of carbon dioxide.

In the above examples the variable factors involved in the process were coordinated to give the desired result of efficient conversion of normally liquid petroleum hydrocarbons, such as are normally found in oils such as stove oil or kerosene, Diesel oil, fuel oil, residual oil of the so-called Bunker C type, and the like, by catalytic reaction with steam, into hydrogen and oxides of carbon.

A gaseous mixture of steam and a vaporized, normally liquid petroleum hydrocarbon was contacted with a heated nickel-containing catalyst with the formation of a gas comprising hydrogen and oxides of carbon and substantially free of other carbonaceous materials.

The liquid hydrocarbon was preheated and then completely atomized with high pressure steam. The exact conditions of temperature of oil and steam, manner of mixing, and ratio in which they are mixed, in order to obtain a completely atomized oil-primary steam mixture, will depend upon the characteristics of the given oil, as will be understood in the art.

The atomized mixture of oil and primary steam was heated in the injection tube so that it would exit therefrom and into the secondary steam at a temperature of about 415° F. to about 450° F. It is desirable to have an exit temperature of from about 300° F. to about 700° F. The temperature selected depends upon the volatility of the oil, its stability to heat, the ratio of oil to steam, and the rate of flow. A temperature is selected which results in partial vaporization of the oil by the time it leaves the injection tube but which does not result in substantial thermal decomposition of the hydrocarbon constituents within the injection tube. It will be understood that the hydrocarbons of the petroleum fractions with a low boiling range are more easily volatilized, but, at the same time, are more stable at an elevated temperature than are those with a higher boiling range.

Other means of properly heating the atomized oil-primary steam mixture prior to admixing with the secondary steam will occur to those practicing the art. For example, most of the heating may be done outside the confines of the cracking tube by passing the mixture through a tube suitably heated externally by electrical means or in a separate combustion furnace.

Furthermore, the oil may be atomized with any other suitable medium. For example, hydrogen under pressure may be used for atomizing the liquid hydrocarbon to form an atomized mixture of liquid hydrocarbon in hydrogen gas. Other gases may be used such as nitrogen, combustion gases, etc. In this event, the secondary steam supplies all of the steam for the reaction. Also, it may be desirable to emulsify the hydrocarbon oil with liquid water, with or without the aid of an emulsifying agent, prior to preparing the atomized mixture of liquid hydrocarbon and steam, or other atomizing medium.

The heated mixture of oil and primary steam, in which the oil had been partially vaporized, was quickly heated and diluted by admixture with a superheated body of steam by causing the oil-primary steam to flow axially into a concurrently moving body of steam, which was confined within the reaction tube. The confining reaction tube adjacent the zone of this mixing was heated to a temperature of about 1300–1400° F. In this manner, the vaporization of the oil was quickly completed, while, at the same time, the hydrocarbons were diluted with steam, thereby minimizing the carbon-producing thermal decomposition of the hydrocarbons. Furthermore, the conditions were conducive to elimination of carbon resulting from any small amount of thermal decomposition that took place. The temperature to which the secondary steam is heated just prior to admixing with the oil-primary steam mixture depends upon the relative amounts of secondary steam and oil-primary steam mixture, the temperature of the oil-primary steam mixture just prior to mixing with the secondary steam, the thermal stability of the hydrocarbons, and the like. In accordance with this invention, it has been found that a temprature range of from about 1000° F. to about 1500° F. for the secondary steam just prior to mixing with the oil-primary steam mixture is satisfactory with petroleum oil fractions characterized by having a gravity corresponding to a numerical value of the A. P. I. gravity not less than about 10.

The most satisfactory conditions as to temperatures, ratio of primary steam to oil, ratio of secondary to primary steam, etc., will be determined by experiment for each particular oil or set of other conditions such as feed rate, type of oil, etc.

The total amount of steam used, primary plus secondary, should be not less than about 1.3 moles per mole of carbon in the oil. On the basis of approximately 14 parts by weight of hydrocarbon for 12 parts by weight of carbon, this corresponds to not less than about 1.7 parts by weight of total steam per each part by weight of oil. Although the economy of the process may be the sole factor to determine the upper limitation of the proportion of steam that may be used, it has been found that the weight ratio of total steam to oil normally need not be more than about 10 to 1.

The exact manner in which the steam is proportioned between atomizing and secondary depends upon a number of factors, as already indicated. As already stated, the atomizing may be performed without the use of any steam, in which case all of the steam is furnished as secondary steam. On the other hand, all of the steam may be introduced in the atomization, and some other heated gaseous mass besides steam may be used for the heating and diluting in the secondary stream of gas. Hot combustion gases, heated hydrogen or nitrogen, etc., may be used.

A principal accomplishment in accordance with this invention, and one of great importance in attaining the objective of efficiently producing hydrogen by the catalytic cracking of higher hydrocarbons with steam, is the formation of an atomized mixture of the higher hydrocarbons with steam and maintaining the material in the atomized state without coalescence of the hydrocarbons, and subsequently quickly heating the mixture to a cracking temperature without appreciable carbon deposition and then immediately contacting the gaseous mixture with a suitable catalyst maintained at a still higher temperature.

Utilizing the method of this invention, the oil-primary steam is passed through the injection tube without increasing the temperature of the oil sufficiently to produce an appreciable amount of carbon formation by thermal decomposition. Conditions favorable to achieving the foregoing are those conditions which are unfavorable to heat transfer to the materials within the injection tube; namely, straight line flow, low thermal conductivity of injection tube wall, free flow past smooth surfaces, and absence of condensates. The determination of the relative dimensions of the injection tube, the heating conditions, and the like, to obtain these indicated desired conditions, will be apparent to those familiar with the art.

The thing of importance is to obtain a gaseous mixture comprising steam and vaporized hydrocarbons from higher petroleum hydrocarbons, particularly normally liquid petroleum oils, containing at least about 1.7 parts by weight of steam for each part by weight of oil, at a temperature of from about 1000° F. to about 1500° F., substantially free of free carbon, and not in contact with a solid catalytic body.

The gaseous mixture of steam and vaporized hydrocarbons which should be at a temperature of at least about 700° F., and preferably from about 1000° F. to about 1500° F. is immediately contacted with the nickel catalyst at a temperature in excess of 1200° F., after the substantially complete evaporization of the hydrocarbons.

The catalyst mass used in the examples was composed of compressed lumps comprising nickel, magnesium oxide (magnesia) and zirconium silicate. Other catalysts have been found to give satisfactory results in the process of this invention. However, it is preferred to use a nickel-magnesia-containing catalyst, and especially when the petroleum hydrocarbons contain sulfur or sulfur-containing compounds, which is usually the case with fractions of crude petroleum which have not been treated to remove the sulfur. The catalyst used in the examples is a preferred catalyst for the process. It possesses high activity for the process of the invention and is characterized by being unusually resistant to the catalytic-poisoning effect of sulfur. Furthermore, it is highly resistant to the usual adverse effects of high temperatures. Similar catalysts, but with different proportions of the nickel, magnesia, and zirconium silicate, have also been found to be efficient in the said process. Other hydrocarbon-steam cracking catalysts may be used in the process of this invention. For example, catalysts comprising nickel supported on aluminous materials such as diaspore, activated alumina, and the like, or alumina-promoted nickel catalysts, have been found to be satisfactory catalysts for use in the process of the present invention. However, they are not so resistant to sulfur poisoning as the indicated preferred nickel-magnesia catalysts.

The reaction mixture of hydrocarbons and steam containing an excess of steam of from about 50% to about 200%, based on the requirement of supplying all the oxygen for converting all the carbon of the hydrocarbons to carbon dioxide, was passed over the catalyst mass, a portion of which was heated to a maximum temperature of from about 1700° F. to about 2000° F., at a space velocity of about 500–600, expressed as cubic feet of steam under normal atmospheric conditions (about 60° F. and one atmosphere pressure) per cubic foot of apparent catalyst volume per hour, with a total steam to hydrocarbon weight ratio of about 5 to 1. The space velocity, when expressed in mixed units of pounds of hydrocarbon per cubic foot of catalyst per hour, was about 5. This value may be decreased or increased with corresponding changes in the other factors. For most satisfactory operation, all the variable factors must be properly coordinated, as will be well understood. For example, with a larger ratio of oil to steam, the space velocity with respect to steam will be decreased to obtain the same conversion, or the temperature may be raised while maintaining the space velocity substantially the same. A higher temperature favors carbon monoxide over carbon dioxide, thus resulting in a larger proportion of unreacted steam for a given proportion of initial steam.

The temperature to be maintained within the catalyst mass may be elevated or lowered, depending upon the selection of given conditions already discussed. Of course, structural limitations as well as the resistance of the catalyst to very high temperatures will dictate the upper limit of the temperature. Catalyst temperatures as high as about 2000° F. have been used with satisfactory results.

At catalyst temperatures of the order of about 1200° F. and lower, appreciable proportions of methane are formed and remain unconverted in the gaseous product. It is preferred, therefore, to use a temperature of not less than about 1200° F., and, in general, a portion of the catalyst will be maintained at about 1600° F., or higher.

Although the invention has been described in detail with particular reference to normally liquid petroleum hydrocarbons, it has been found that the invention may be utilized with benefit in the production of hydrogen from hydrocarbons higher than methane and ethane, such as propane, the butanes, readily vaporized (volatile) normally liquid hydrocarbons, and the corresponding olefins. By utilizing the method of the invention of forming a uniformly dispersed system of hydrocarbon and steam (or other suitable inert gas) at a comparatively low temperature, and injecting said dispersed system (liquid in gas in case of oils, and gas in gas with hydrocarbons such as propane, etc.) at a comparatively low temperature, into a superheated gas stream (steam or inert gas) and immediately contacting the resulting gaseous mixture containing hydrocarbon and steam with a suitable catalyst maintained at a suitable elevated temperature, it has been possible to efficiently convert the hydrocarbons to hydrogen and carbon oxides without appreciable carbon deposition.

The reaction tube which defines the shape of the catalytic mass and serves as both a confining means for the reaction zone and the reactants passing therethrough and also as a heat-transfer means for heating the reactants (and catalyst) is preferably of heat-resisting, chromium-alloy steel composition.

If it is desired, the hot cracked gases, high in reducing properties, by virtue of the major content of hydrogen and carbon monoxide, may be used directly for reducing metal oxide ores, the gases being preheated to a still higher temperature before use if it is desirable.

The resulting cracked gases obtained from the hydrocarbon-steam reaction may be treated with excess steam in contact with an iron oxide or iron oxide-chromium oxide catalyst at a temperature of the order of about 350–400° C. to convert the carbon monoxide to carbon dioxide, with the production of an equivalent amount of hydrogen. The carbon dioxide may then be separated from the hydrogen by well-known methods, giving hydrogen which may be subsequently used in ammonia synthesis, hydrogenations, and the like.

Thus, the cracked gases produced in accordance with this invention find great utility in well-established industries of great commercial importance. Furthermore, the present invention is of great utility since it provides an efficient and economical process for the production of hydrogen from liquid petroleum products which can be more easily distributed in large volume and handled with greater safety than the heretofore used natural gas, thus making hydrogen available in geographic areas not now accessible to economical hydrogen production.

Where, in the specification and appended claims, the term "normally liquid petroleum hydrocarbon" is used, it is meant to designate a naturally-occurring petroleum oil, such as crude oil, or fractions thereof which are produced in the course of refining operations and which are liquid under normal atmospheric conditions or slightly elevated temperature. Such fractions are those commonly designated as the gasoline, kerosene, stove oil, Diesel oil, fuel oil, residual or Bunker C oil fractions. The term also refers to individual hydrocarbons which occur in petroleum oils and which are normally liquid and to mixtures thereof.

The term "higher petroleum hydrocarbons" is meant to designate hydrocarbons related to ordinary petroleum in source and general chemical characteristics but limited to those hydrocarbons which contain more than two carbon atoms per molecule.

The term "atomized mixture" is meant to refer to a substantially uniform dispersion of a liquid in a gaseous dispersion medium. An illustrative example of what is meant by an "atomized mixture" is ordinary fog, which is a dispersion of liquid water in the gaseous oxygen and nitrogen of the atmosphere. An "atomized mixture" is to be distinguished, therefore, from a gaseous mixture of the vapor of a normally liquid substance with a normally gaseous substance.

What I claim and desire to protect by Letters Patent is:

1. A process of preparing hydrogen which comprises passing a gaseous hydrocarbon into an injection tube extending for a considerable distance into the entrance of a heated reaction tube, passing steam in contact with the reaction tube into an outer zone surrounding the injection tube and concurrent to the flow of the hydrocarbon to form a curtain of passing steam between the outside of the injection tube and the inside of the heated reaction tube, passing the gases from the injection tube and the outer zone into a mixing zone within the reaction tube, immediately passing the mixed gases from the mixing zone through a catalytic zone within the reaction tube in contact with nickel catalyst, and withdrawing from the heated reaction tube a gaseous product comprising hydrogen and oxides of carbon substantially free of other carbonaceous materials.

2. A process of preparing hydrogen which comprises passing an atomized mixture of petroleum hydrocarbon and steam into an injection tube extending for a considerable distance into the entrance of a heated reaction tube, passing steam in contact with the reaction tube into an outer zone surrounding the injection tube and concurrent to the flow of the hydrocarbon and steam to form a curtain of passing steam between the outside of the injection tube and the inside of the heated reaction tube, passing the gases from the injection tube and the outer zone into a mixing zone within the reaction tube, immediately passing the mixed gases from the mixing zone through a catalytic zone within the reaction tube in contact with nickel catalyst, and withdrawing from the heated reaction tube a gaseous product comprising hydrogen and oxides of carbon substantially free of other carbonaceous materials.

3. A process of preparing hydrogen which comprises passing an atomized mixture of petroleum hydrocarbon and steam into an injection tube extending for a considerable distance into the entrance of a heated reaction tube, passing steam in contact with the reaction tube into an outer zone surrounding the injection tube and concurrent to the flow of the hydrocarbon and steam to form a curtain of passing steam between the outside of the injection tube and the inside of the heated reaction tube, passing the gases from the injection tube and the outer zone into a mixing zone within the reaction tube, immediately passing the mixed gases from the mixing zone through a catalytic zone within the reaction tube in contact with nickel catalyst maintained at a temperature above about 1200° F., and withdrawing from the heated reaction tube a gaseous product comprising hydrogen and oxides of carbon substantially free of other carbonaceous materials.

4. A process of preparing hydrogen which comprises passing an atomized mixture of petroleum hydrocarbon and primary steam into an injection tube extending for a considerable distance into the entrance of a heated reaction tube, passing secondary superheated steam in contact with the reaction tube into an outer zone surrounding the injection tube and concurrent to the flow of the hydrocarbon and steam to form a curtain of passing steam between the outside of the injection tube and the inside of the heated reaction tube, passing the gases from the injection tube and the outer zone into a mixing zone within the reaction tube, immediately passing the mixed gases from the mixing zone through a catalytic zone within the reaction tube in contact with nickel catalyst maintained at a temperature above about 1200° F., and withdrawing from the heated reaction tube a gaseous product comprising hydrogen and oxides of carbon substantially free of other carbonaceous materials.

5. A process of preparing hydrogen which comprises passing an atomized mixture of petroleum hydrocarbon and primary steam into an injection tube extending for a considerable distance into the entrance of a heated reaction tube, passing secondary superheated steam in contact with the reaction tube into an outer zone surrounding the injection tube and concurrent to the flow of the hydrocarbon and steam to form a curtain of passing steam between the outside of the injection tube and the inside of the heated reaction tube, adding the primary steam and the secondary steam in an amount to provide at least about 1.7 parts by weight of steam for each part by weight of hydrocarbon, passing the gases from the injection tube and the outer zone into a mixing zone within the tube maintained at a temperature above about 700° F., immediately passing the mixed gases from the mixing zone through a catalytic zone within the reaction tube in contact with nickel catalyst maintained at a temperature above about 1200° F., and withdrawing from the heated reaction tube a gaseous product comprising hydrogen and oxides of carbon substantially free of other carbonaceous materials.

6. A process of preparing hydrogen which comprises passing an atomized mixture of normally liquid petroleum hydrocarbon and primary steam into an injection tube extending for a considerable distance into the entrance of a heated reaction tube, passing secondary superheated steam in contact with the reaction tube into an outer zone surrounding the injection tube and concurrent to the flow of the hydrocarbon and steam to form a curtain of passing steam between the outside of the injection tube and the inside of the heated reaction tube, adding the primary steam and the secondary steam in an amount to provide at least about 1.7 parts by weight of steam for each part by weight of hydrocarbon, passing the gases from the injection tube and the outer zone into a mixing zone within the tube maintained at a temperature above about 700° F., immediately passing the mixed gases from the mixing zone through a catalytic zone within the reaction tube in contact with nickel catalyst maintained at a temperature above about 1200° F., and withdrawing from the heated reaction tube a gaseous product comprising hydrogen and oxides of carbon substantially free of other carbonaceous materials.

7. A process of preparing hydrogen which comprises passing an atomized mixture of a volatile petroleum hydrocarbon containing more than two carbon atoms per molecule and primary steam into an injection tube extending for a considerable distance into the entrance of a heated reaction tube, passing secondary superheated steam in contact with the reaction tube into an outer zone surrounding the injection tube and concurrent to the flow of the hydrocarbon and steam to form a curtain of passing steam between the outside of the injection tube and the inside of the heated reaction tube, adding the primary steam and the secondary steam in an amount to provide at least about 1.7 parts by weight of steam for each part by weight of hydrocarbon, passing the gases from the injection tube and the outer zone into a mixing zone within the tube maintained at a temperature above about 700° F., immediately passing the mixed gases from the mixing zone through a catalytic zone within the reaction tube in contact with nickel catalyst maintained at a temperature above about 1200° F., and withdrawing from the heated reaction tube a gaseous product comprising hydrogen and oxides of carbon substantially free of other carbonaceous materials.

8. A process of preparing hydrogen which comprises passing a gaseous hydrocarbon into an injection tube extending for a considerable distance into the entrance of a heated reaction tube, passing steam in contact with the reaction tube into an outer zone surrounding the injection tube and concurrent to the flow of the hydrocarbon to form a curtain of passing steam between the outside of the injection tube and the inside of the heated reaction tube, passing the gases from the injection tube and the outer zone into a mixing zone within the reaction tube, immediately passing the mixed gases from the mixing zone through a catalytic zone within the reaction tube in contact with hydrocarbon-steam cracking catalyst, and withdrawing from the heated reaction tube a gaseous product comprising hydrogen and oxides of carbon substantially free of other carbonaceous materials.

JAMES H. SHAPLEIGH.

REFERENCES CITED

The following references are of record in the file of this patent:

UNITED STATES PATENTS

| Number | Name | Date |
|---|---|---|
| 1,128,804 | Mittasch et al. | Feb. 16, 1915 |
| 1,944,483 | Zieley | Jan. 23, 1934 |
| 1,951,774 | Russell et al. | Mar. 20, 1934 |
| 2,208,123 | Duncan | July 16, 1940 |